Feb. 10, 1970   KARL-JOHAN BOSTROM   3,494,632
MEANS FOR CONTROLLING AND REGULATING THE LOAD
ACTING ON VEHICLE AXLES
Filed Aug. 21, 1967

United States Patent Office 3,494,632
Patented Feb. 10, 1970

3,494,632
MEANS FOR CONTROLLING AND REGULATING THE LOAD ACTING ON VEHICLE AXLES
Karl-Johan Bostrom, Boliden, Sweden, assignor to Boliden Aktiebolag, Stockholm, Sweden
Filed Aug. 21, 1967, Ser. No. 662,173
Claims priority, application Sweden, Aug. 30, 1966, 11,670/66
Int. Cl. B60p
U.S. Cl. 280—104.5                    9 Claims

ABSTRACT OF THE DISCLOSURE

A means for controlling and regulating the axle load on vehicles of the type which are supported by at least two axles, of which one is a driving axle and the other an idler axle; the load of which can be regulated by means of a cushion of variable fluid pressure. At least a portion of the vehicle is supported by a cushion of pressure medium which communicates with the cushions of pressure medium for the idler axle so that the wheels of said last mentioned idler axle are pressed against the road with such a pressure that the load on the vehicle is proportioned in an equalizing manner on all wheels so that the load carried by the latter is kept at a value not exceeding the highest permissible value.

---

The present invention relates to means for controlling and regulating the axle load on vehicles of the type which are supported by at least two axles, of which the one is a driving axle and the other an idler axle; the axle load of which can be regulated by means of a cushion of variable fluid pressure.

In view of the increasing deterioration and disintegration of roads caused by the exaggerated loads exerted to the surfaces thereof by heavy transport vehicles, e.g. tandem-driven lorries supported on wheel units, so-called bogies, it has been necessary to prescribe maximum limits for permitted axle loads. As a result, vehicle manufacturers have been forced to find a practical solution to the problem of distributing the total load of the vehicle over their axles. One suggested solution, particularly directed to transport vehicles supported by wheel units, so-called bogies, is to provide an extra idler axle the load on which can be regulated by means of a cushion of pressure medium, the pressure of which can be varied and which serves to transfer a portion of the load onto the said extra axle so that said load is proportioned in an equalizing manner on all groups of supporting wheels so that the load thereon is kept at the highest permitted value. However, the previous suggestions are based upon the conception of setting the pressure of the pressure medium to a suitable, permanent value which has been ascertained by experience. These suggestions, however, were found unacceptable beause it is impossible to determine positively how the loads on the axles actually behave.

The main object of the present invention is therefore to provide a means which enables the axle loads to be controlled and regulated automatically whilst utilizing means taken from apparatus known per se.

This object is achieved by the present invention which is mainly characterized in that at least a portion of the vehicle load is supported by a cushion of pressure medium which communicates with the cushion of pressure medium for the idler axle.

The invention will be described more closely below with reference to a number of embodiments of the same, illustrated diagrammatically in the accompanying drawings and, in conjunction therewith additional characterizing figures of the invention will also be disclosed.

Figure 1:
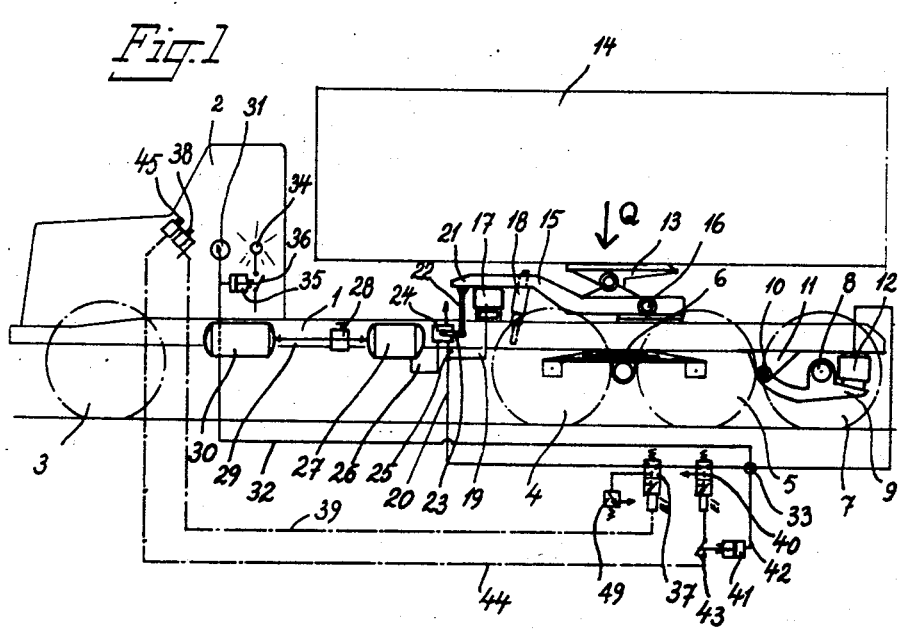
FIGURE 1 shows diagrammatically a vehicle of the so-called semi-trailer type on which the load on the trailer rests substantially direct over a bogie, which in the shown instance includes two interconnected pairs of supporting wheels and an extra group of supporting wheels which, via a cushion of pressure medium, can be made to take up varying portions of the total load.

In the drawing the reference numeral 1 indicates a chassis constructed of support beams in the normal manner, and which includes a driving cab 2 and rests on front wheels 3. The chassis is also supported on a bogie comprising wheels 4 and 5 which are held resiliently interconnected by means of leaf spring arrangements 6, in a manner known per se. In the shown example a group of idler wheels 7, substantially free of the bogie, are arranged behind said bogie wheels 4, 5; the axle 8 of wheels 7 is pivotally arranged in two catch levers or the like 9, which are pivotally mounted around pivots 10 in brackets 11, extending down from the chassis 1. Arranged between the distal ends of the said catch levers or the like 9 and the bottom of the chassis 1 are two cushions 12 of pressure medium, disposed one on each side of the chassis. A projecting portion 14 of a trailer rests on a pivot support generally indicated by the reference numeral 13; the total load on the pivot support being indicated by the arrow Q. The pivot support 13 is carried on lever means 15 which are mounted around a pivot pin 16 securely attached to the chassis 1. The forward end of the lever 15 rests on a commonly known cushion 17 of pressurized fluid which, for instance, may comprise a piston arrangement, bellows or the like. Further, the lever 15 is supported by suitable shock absorbing means 18. The pressure-medium cushion arrangement 17 thus supports a portion of the load Q and is connected, via lines 19 and 20, to the cushion 12 for the pair of idler wheels 7. Consequently when the cushion 17 is loaded by a portion of the total load Q, the same specific pressure is manifest in the pressure medium of the cushion 12. Projecting downwards from the front end 21 of the lever 15 is an operating rod or the like 22 which is pivotally connected with a valve arm 23 which operates a valve 24. The valve is connected via an intermediate line 25 to the lines 19 and 20, which comprise the communicating means between the cushions of pressure medium, and also connected, via a line 26, to a pressure medium reservoir 27, which, via a safety valve 28 and a line 29, communicates with the pressure-medium container 30 in the brake pressure system of the vehicle. The valve 28 is intended to function as a so-called emergency valve, i.e. is adapted to cut off the supply of pressure medium to the reservoir 27 when the pressure of the pressure medium in the brake system approaches a dangerous level.

Based upon the fact that it is possible to adjust the load on the driving axles of the bogie wheels 4 and 5 automatically by means of the idler axle 8 the arrangement according to the present invention is intended to operate in the following manner.

The load Q rests upon the pivotal support 13 which in turn, through the intermediary of the lever system 15, rests on cushion of pressure medium, e.g. pressure oil or preferably air, the diameter of the cushion being so adapted that the specific pressure obtains the value required in the cushion 12 in order that the axle load on the axle 8 imparts a pressure equal to that of the axles of the bogie wheels 4, 5 of which at least the latter are driven wheels. If the load Q increases the specific pressure in the air cushion 17 and in the air cushion 12 rises and the load on the idler axle 8 is in this way increased according to the increased load Q. Owing to the increased load the pivotal support 13 sinks down and in order to reset its height position the operating system 22, 23 actuates the valves 24, serving as a level valve, so that compressed air from the reservoir 27 flows into the air cushion 17 and the air cushion 12 until the pivotal support 13 returns to the desired level. On the other hand, if the load Q is lightened the pivotal support 13 is lifted up as a result of the high specific pressure in the air cushion 17; whereby the operating system 22, 23 open the level valve 24 so that the pressurized fluid exhausts from the system to atmosphere, until the pivotal support 13 has returned to its correct position. The specific pressure in the air cushion 17, under the pivotal support 13, and the air cushions 12 over the idler shaft 8 has thus fallen, so that the load on the axle 8 is adjusted in keeping with the reduced load Q.

In the illustrated example compressed air is taken from the compressed-air system utilized in the braking system of the vehicle and, consequently, to prevent a failure of the braking system in the event of any of the air cushions 17 or 12 rupturing the emergency valve 28 positioned between the compressed air reservoirs 27 and 30 comes into operation. The emergency valve 28 will not release compressed air to the reservoir 27 unless the pressure in the tank or the reservoir 30 is above a predetermined minimum, e.g. 5.5 atm. This pressure is sufficient to enable the brakes of the vehicle to function satisfactorily.

Further, it is possible to observe the load on the idler axle 8 by means of a gauge or manometer 31 connected, via a line 32 and the pump 33, to the communication line 20 between the air cushions. A lamp 34 is arranged in the driving cab to warn in the event of the pressure falling below a predetermined value. The warning lamp is constructed so that a fluid pressure actuated electrical switching means 35 senses the pressure in the line 32 and, if this pressure is too low, makes a contact so that current passes to the said warning lamp, which lights up.

To obtain a better traction of the bogie driving wheels on wet road surfaces, for instance, i.e. to enable a temporary increase in the axle pressure on these wheels (even a pressure which temporarily exceeds the maximum permitted value), it has been found acceptable to lighten the axle load on the idler axle 8 by about 50%, for short periods. For this purpose an electrically operated valve 37 has been inserted into the line 20, between the air cushions 12 and 17. The electric valve, which is normally open, can be actuated by an operating button or the like 38, via the electric line 39, so that the valve 37 is supplied with current, whereby the valve 37 closes the communication between the air cushion 17 and the air cushions 12, the latter being connected instead over the valve 37 to a valve 49 which releases air from the air cushions 12, to a latch position where the valve is closed and the air pressure is lowered to, for instance, 50% of that in the air cushion 17. In this way the axle load on the axle 8 is reduced to the degree determined by the function of the valve 49. The pressure in the air cushion 17 is not affected by this operation since the electric valve 37 prevents air from flowing from the air cushion 17.

To enable the load on the idler axle 8 to be completely removed when the vehicle is empty or driving with a reduced load an additional electrical valve 40 has been positioned behind the valve 37 in the connection line 20 between the air cushion 17 and the air cushions 12. To prevent this valve 40 from being used when the vehicle is fully loaded a fluid pressure actuated electrical switching means 41 has been arranged, connected to the pump 33 via the line 42, and normally holds a contact 43 broken; the contact being connected in a circuit 44 for the electric valve 40 and the circuit being operated from the driving cab by means of a button 45. When the vehicle is loaded and the pressure in the pressure system is subsequently higher, the fluid pressure actuated electrical switching means 41 breaks the current in the circuit 44 and no current can pass therein, even though the button 45 be pressed. The function of the valve 40 is, in other respects, the same as that of the valve 37, except for the difference that the compressed air in the air cushions 12 can be completely evacuated through the valve 40, so that the load on the axle 8 is completley removed.

Figure 2:
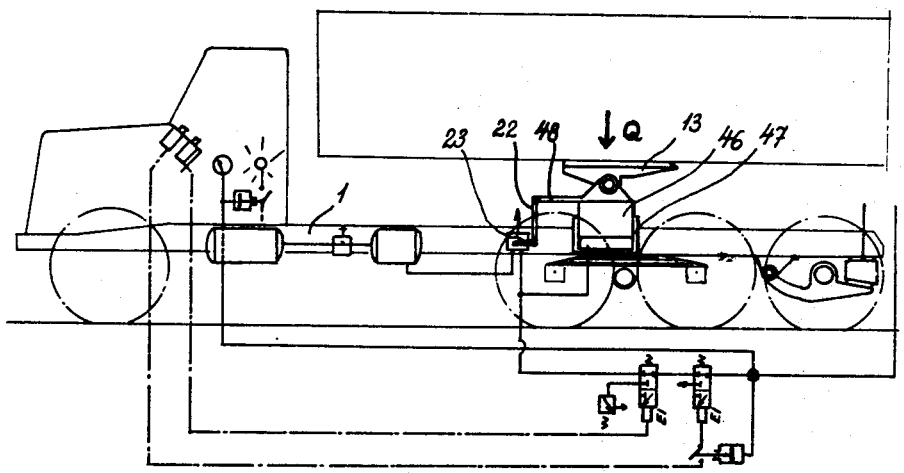
FIGURE 2 shows a modified embodiment of the arrangement according to FIGURE 1.

In FIGURE 1 it has been illustrated how a cushion of pressure medium can be loaded with only a portion of the total load Q. In FIGURE 2 is shown an example wherein the complete total load Q is taken up on an air cushion. Shown in FIGURE 2 is the pivotal support member 13 which rests directly on air air cushion arrangement 46, e.g. a piston operating in a cylinder 47. In this instance the lever 15 is omitted, the operating means 22 and 23, however, being connected direct to the member 46 via a projection or the like 48. Remaining details in FIGURE 2 completely coincide with corresponding details in FIGURE 1, and consequently no description of these details in connection with the embodiment of FIGURE 2 is considered necessary.

The invention is not restricted to the described and illustrated embodiments. Thus, the invention can be utilized in transport vehicles resting on at least one pair of normal driving wheels. Further, the invention can be adopted in vehicles supported by one or more bogies. All the wheels or at least one group of wheels may be driving wheels in the said bogies and, further, several bogies may be co-arranged with the idler wheels of the type indicated by the reference numeral 7 in the figure. Several groups of idler wheels can be arranged in connection with each bogie and the said groups of idler wheels may be placed in front of and/or behind the bogies, seen in the cross direction of the vehicle.

What is claimed is:

1. A system for redistributing the load of a trailer between trailer load supporting wheel axles of a tractor vehicle of the type having a group of road engaging wheels, said axles being suspended by leaf springs, and said tractor having an idler axle supporting an extra group of road engaging wheels, said idler axle being suspended by pressure-fluid spring cushions of the variable pressure type, said tractor vehicle supporting said trailer and the trailer load via a swivel table, characterized in that said swivel table rests on the chassis of the tractor vehicle via a load sensing device having a load cushion of the fluid pressure medium type fixed to said chassis, a pressure-fluid circuit comprising said load cushion, said pressure-fluid spring cushions, a source of pressurized fluid medium and a control valve means, said control valve means sensing the height of the said table relative to said chassis due to the force exerted on said table by said trailer and load and to accordingly selectively open and close communication between said load cushion and said source of pressurized fluid medium to adjust said load cushion unitl the swivel table has reached a predetermined level above the chassis and said extra group of road engaging wheels exert a predetermined amount of pressure on the road.

2. A system as claimed in claim 1 in which said control valve means further comprises a control valve and valve operating means connected to said load cushion and which in response to the compression of the load cushion open and close the control valve to establish communication between the source of pressurized fluid medium and the load cushion and the spring cushions, and between the load cushion and the spring cushions and the atmosphere, respectively.

3. A system as claimed in claim 1 in which the source of pressurized fluid medium includes, in part, the vehicle brake pressure system.

4. A system as claimed in claim 3 further comprising an automatically operating cut-off valve inserted between the vehicle brake pressure system and the pressure-fluid circuit, said cut-off valve being adapted to interrupt the passage of pressurized fluid medium if the pressure in the source of pressurized fluid medium falls below the minimum required pressure of the brake system.

5. A system as claimed in claim 1 further comprising a first normally open, electrically operably actuated valve device means including an exhaust valve inserted in the fluid pressure circuit between the load cushion and the spring cushions, said last mentioned valve device means when actuated closing the communication between the load cushion and the spring cushions and connecting the spring cushions of the idler axle to atmosphere through said exhaust valve, said exhaust valve including means for cutting off the outflow of air when the pressure in said spring cushions has dropped to a predetermined minimum pressure.

6. A system as claimed in claim 5 further comprising a second electrically operably actuated, normally open valve means inserted in the pressure fluid circuit between said load cushion and said spring cushions and behind said first electric valve, said second electrically operable valve means being selectively actuable into at least first and second positions so that when in said first position, the load cushion and spring cushions are in communication through said first electrically operable valve and said second electrically operative valve means, and when in said second position, interrupts said last mentioned communication and connects said spring cushions to exhaust to the atmosphere whereby the load on said idler axle is removed.

7. A system as claimed in claim 6 wherein said second electrically operable valve means includes an electrically actuated valve, an electric switch, an energizing circuit, and pressure actuated means disposed in said pressure fluid circuit between said load cushion and said spring cushions and responsive to the pressure therein, said pressure actuated means being also disposed in said energizing circuit between said switch and said electrically actuated valve whereby when the pressure in said load cushion exceeds a predetermined value, said pressure actuated means interrupts said energizing circuit.

8. A system as claimed in claim 1 further comprising means for reducing pressure in only said spring cushions whereby the complete total load is taken up by said load cushion.

9. A system as claimed in claim 1 including means wherein said load and spring cushions are substantially equally pressurized so that only a portion of the total load is taken up by said load cushion.

References Cited

UNITED STATES PATENTS 2,902,289   9/1959   North.
3,201,141   8/1965   Bernstein et al. _____ 120—22 X

FOREIGN PATENTS 936,001   9/1963   Great Britain.

A. HARRY LEVY, Primary Examiner

U.S. Cl. X.R.

180—22; 280—405, 438